United States Patent
Campbell et al.

(10) Patent No.: US 11,480,494 B2
(45) Date of Patent: Oct. 25, 2022

(54) SEAL TESTER APPARATUS AND METHOD

(71) Applicant: Snack Engineering LTD, Banbridge (GB)

(72) Inventors: Trevor Campbell, Banbridge (GB); Joshua Campbell, Banbridge (GB)

(73) Assignee: Snack Engineering LTD, Banbridge (GB)

( * ) Notice: Subject to any disclaimer, the term of this patent is extended or adjusted under 35 U.S.C. 154(b) by 0 days.

(21) Appl. No.: 17/605,273

(22) PCT Filed: Apr. 21, 2020

(86) PCT No.: PCT/EP2020/061089
§ 371 (c)(1),
(2) Date: Oct. 21, 2021

(87) PCT Pub. No.: WO2020/216742
PCT Pub. Date: Oct. 29, 2020

(65) Prior Publication Data
US 2022/0146365 A1    May 12, 2022

(30) Foreign Application Priority Data
Apr. 25, 2019    (EP) .................................... 19171197

(51) Int. Cl.
*G01M 3/32* (2006.01)
*B07C 5/34* (2006.01)
*B07C 5/342* (2006.01)

(52) U.S. Cl.
CPC ........... *G01M 3/3263* (2013.01); *B07C 5/342* (2013.01); *B07C 5/3404* (2013.01); *G01M 3/3272* (2013.01)

(58) Field of Classification Search
CPC .... G01M 3/3263; G01M 3/3272; G01M 3/36; B07C 5/3404; B07C 5/342
See application file for complete search history.

(56) References Cited

U.S. PATENT DOCUMENTS 4,671,101 A * 6/1987 Franklin ................. G01M 3/36
73/49.3
5,251,422 A * 10/1993 Goodman ............... B65B 5/061
53/251
(Continued)

FOREIGN PATENT DOCUMENTS

CN    208847119 U   *  5/2019
CN    109059770 B   *  9/2020    ............. G01B 11/00
(Continued)

*Primary Examiner* — Natalie Huls

(57) ABSTRACT

The invention provides an apparatus and method for testing the integrity of a package, the apparatus comprising a first volume detecting means for detecting a first volume of the package at a first position; conveying means for moving the package from the first position to a second position downstream from the first position; compression means for providing a compression force on the package; a second volume detecting means for detecting a second volume of the package at the second position; determining means for determining the integrity of the package based upon a change in volume of the package; and rejecting means for removing packages, the integrity of which is determined by the determining means not to be intact, wherein the determining means is in electronic signal communication with each volume detecting means independently, wherein the determining means is in electronic signal communication with the rejecting means, wherein the compression means is located above a portion of the conveying means and wherein each volume detecting means independently comprises either two cameras for producing an image of the package or a single time of flight camera.

20 Claims, 4 Drawing Sheets

(56) References Cited

U.S. PATENT DOCUMENTS

| | | | | |
|---|---|---|---|---|
| 5,533,385 | A | * | 7/1996 | Frievalt .................... B07C 5/34 |
| | | | | 209/523 |
| 5,786,530 | A | * | 7/1998 | Fenlon ..................... G01M 3/36 |
| | | | | 73/49.3 |
| 6,474,141 | B1 | * | 11/2002 | Takaoka .................. G01M 3/36 |
| | | | | 73/49.3 |
| 7,107,823 | B1 | * | 9/2006 | Lovvorn ................. G01M 3/36 |
| | | | | 73/49.3 |
| 9,346,169 | B2 | * | 5/2016 | Burns ................... B25J 9/0093 |
| 2003/0015023 | A1 | * | 1/2003 | Bennett ................. G01B 11/00 |
| | | | | 73/49.3 |
| 2004/0158353 | A1 | * | 8/2004 | Poterek ............. G05B 23/0229 |
| | | | | 700/244 |
| 2008/0127716 | A1 | * | 6/2008 | Eliasson ............... G01M 3/363 |
| | | | | 73/45.4 |
| 2010/0012464 | A1 | * | 1/2010 | Schiesser ............... B65G 43/08 |
| | | | | 198/460.1 |
| 2013/0141571 | A1 | * | 6/2013 | Yasooka ............... H01M 10/04 |
| | | | | 73/37.5 |
| 2018/0172603 | A1 | | 6/2018 | Piana |
| 2019/0202642 | A1 | * | 7/2019 | Schroader .............. B65G 43/10 |

FOREIGN PATENT DOCUMENTS

| | | | | |
|---|---|---|---|---|
| EP | 1333267 | A1 | | 8/2003 |
| EP | 1411337 | A1 | | 4/2004 |
| EP | 2584334 | A1 | | 4/2013 |
| JP | 2017067622 | A | * | 4/2017 |
| WO | WO-2021113664 | A1 | * | 6/2021 ............ G01M 3/103 |

\* cited by examiner

SEAL TESTER APPARATUS AND METHOD

FIELD OF THE INVENTION

The present invention relates to the field of seal checking, in particular to apparatus for testing the integrity of packages such as bags used in the food industry. The invention further relates to a method of testing the integrity of such packages.

BACKGROUND TO THE INVENTION

Bags in the food industry generally have a top, bottom and vertical back seal and are commonly made from foil or film. Such bags are typically made using a vertical form fill bag maker or horizontal flow wrapper.

Increasingly, packages used in the food industry are flushed with gas, e.g. nitrogen, when they are sealed so as to remove the oxygen in order to increase the shelf life of the food product contained in the package. Common industries which use such technology include those that deal with meat, packaged salad and especially potato crisps and snacks. The integrity of the oxygen barrier is paramount to ensuring that the food product will meet the expected shelf life as a package with even a small leak can lead to product quality issues.

Another recent growth in the market has been the introduction of automatic case-packing machines. These machines take bags from a conveyor downstream from the bag maker and put them into boxes before sealing the box automatically. The human check that used to occur before a bag was manually placed in the box has been removed from this new automatic case-packing system, resulting in substantially more faulty bags being packed.

At the speeds most modern bag makers and fillers operate, current integrity testing systems used downstream are only capable of detecting leaks of approximately 3 mm and above in size. This means that bags with punctures (caused, for example, by poor machine setup or by product getting into the seal) will not be detected until the customer purchases the product by which time the bag may be fully deflated.

Current package handling systems which test the integrity of the seal of a package, such as the apparatus disclosed in U.S. Pat. No. 6,941,796 to Ishida Co. Ltd., comprise a height detector which detects a height of the package, a test portion which determines the integrity of the seal based upon a position of the test portion as a function of time when contacting the package, and a mover which moves the test portion into an initial position of contact with the package based upon the detected height. In this prior art apparatus, the test portion includes a test head contacting the package, and the mover includes a servo motor driving the test head, and a ball screw linking the servo motor and the test head.

In the prior art systems, a package is squeezed between two running belts and the initial height between the two belts is measured to ascertain the height of the package. As the bag travels along the belt, the distance between the belts is continuously measured by means of a servo/encoder pair. If the bag being tested is found to have decreased in height by a given percentage, the bag is rejected further downstream.

Current systems on the market have several fundamental flaws. For example, the accuracy of current systems is around 3 mm when running bags of crisps at 120 bags per minute. This is due to the increasing speed of modern bag makers and physical limitations in what can be measured by using a mechanical action to measure the heights of the bags. Bag makers over the next few years are entering a new generation of design with some manufacturers expecting outputs of up to 200 bags per minute. The present inventors are of the opinion that the known technology will be unable to operate accurately at these expected speeds.

Furthermore, mechanical complexity and maintenance costs are very high for current seal testing systems.

It is therefore an object of the present invention to provide apparatus for testing the integrity of a package, e.g. of bags used in the food industry, which alleviates the above-mentioned disadvantages and/or provides a suitable alternative.

It is a further object of the present invention to provide a method of testing the integrity of a package, e.g. of bags used in the food industry, which alleviates the above-mentioned disadvantages and/or provides a suitable alternative.

SUMMARY OF THE INVENTION

In a first aspect according to the invention, there is provided an apparatus for testing the integrity of a package, the apparatus comprising a first volume detecting means for detecting a first volume of the package at a first position, conveying means for moving the package from the first position to a second position downstream from the first position, compression means for providing a compression force on the package, a second volume detecting means for detecting a second volume of the package at the second position; determining means for determining the integrity of the package based upon a change in volume of the package; and rejecting means for removing packages, the integrity of which is determined by the determining means not to be intact, wherein the determining means is in electronic signal communication with each volume detecting means independently, wherein the determining means is in electronic signal communication with the rejecting means, wherein the compression means is located above a portion of the conveying means and wherein each volume detecting means independently comprises two cameras for producing a stereo image of the package or a single time-of-flight camera, i.e., a camera which emits light and records the time taken for the light to return to the camera from the package.

Accordingly, the apparatus according to the invention measures the true volume of a package, e.g. a bag of crisps, using minimal-contact between the package and the apparatus.

In a particularly preferred embodiment, each volume detecting means comprises two black and white cameras for producing a stereo image of the package.

With the apparatus according to the invention, no physical interaction with the package is required to obtain a measurement of the volume thereof. This means there are much fewer moving parts, such as for example bearings and motors, than in prior art systems which leads to a reduction in operating costs as well as a reduction in downtime for maintenance.

As a package travels between the first and second positions, an appropriate amount of pressure is applied to the package by the compression means, preferably using a downwardly projecting force, and if the package is not leaking, i.e. if all of its seals are intact and the bag has no holes, the package will travel to the second position with no change to its volume. If, on the other hand, any one of the seals is not intact or if there is a puncture in the package, for example caused upstream from the apparatus by faulty film, a badly set up bagger or by product piercing the package when the package is dropped in the bagger, the compression means will force air out of the puncture, e.g. the hole in the seal, thereby decreasing the volume of the package.

The determining means preferably comprises a processing system such as a computer to compare the volume of a package at the first position and the volume of the package at the second position.

The package to be tested preferably has at least one seal, typically three seals including a top seal, a bottom seal and a back seal, with the back seal extending from the top seal to the bottom seal. However, this is not considered to be limiting and packages with more seals, e.g. 6 seals such as Quadro seal packages, or no seals may also be tested using the apparatus of the invention.

The package to be tested may be made of foil or film such as metallised foils, plastic film. Alternatively, the package to be tested may be made of waxed paper.

The package to be tested is preferably a flexible gas-filled package, optionally having a pillow shape. Suitable packages include salad bags, crisp packets, as well as packages for cosmetics, wet wipes, dried fruit, nuts and/or snacks. However, this list is by no means to be considered limiting and the integrity of other types of packages may be tested by the apparatus according to the invention provided the product in the package is not so tightly packed that compression would not remove air when pressure is applied to the package by the compression means.

Additionally, or alternatively, each package is provided with a barcode comprising package size information and the apparatus further comprises means of scanning the barcode, e.g. as it passes the first position, wherein said means are in electronic signal communication with the determining means. Suitable package size information preferably includes minimum and maximum package sizes and information on product type to ensure that if a package is completely flat, it will be rejected since it will not compress when pressed and hence no reduction in volume will be detected. This information is preferably used by the determining means to control the amount of force applied by the compression means.

Preferably, the apparatus tests the integrity of a plurality of the packages. In this embodiment, packages are presented to the apparatus one after the other such that the first volume detecting detects the volume of each package individually and the conveying means conveys individual ones of the plurality of the packages to the second position such that the second volume detecting detects the volume of each package individually.

To allow multiple packages to be moved by the conveying means and compressed by the compression means at any one time, the force applied by the compression means is preferably spread over multiple points along the conveying means.

Preferably, the compression means comprises a belt conveyor with one or more compression modules in contact with the interior surface of the belt, particularly preferably a plurality of compression modules.

The or each compression module independently comprises one or more, preferably two, rotatable compression rollers attached to a rotary actuator.

The surface of the or each compression roller is preferably not smooth, particularly preferably the surface of the or each compression roller is provided with transverse protrusions or ridges.

The or each actuator is preferably in electronic signal communication with the determining means. The amount of force applied by the or each compression module to the interior surface of the belt is preferably variable, e.g. by changing the pressure going to the or each actuator.

Alternatively, the apparatus further comprises adjustment means such as one or more pneumatic cylinders to adjust the distance between the belts, e.g. to adjust the height of one belt with respect to the other. This allows both for accommodation of different package sizes as well as the variation of pressure exerted on the package. In this embodiment, the adjustment means is preferably in electronic signal communication with the determining means. In this embodiment, no operator interaction is required when a new size of package is put through the apparatus.

The conveying means is preferably adapted to stop a package moving position on the conveying means when being transported. For example, the conveying means surface may be provided with a plurality of projections, e.g. elevated triangular shapes, to reduce contact area between the package and the conveying means and increase contact pressure to optimise grip.

Preferably, the conveying means comprises a belt conveyor. In this embodiment, the belt surface is preferably solid, i.e. the conveying means belt preferably has a closed surface, and is optionally provided with a rubber grip to stop the package from moving position on the belt when being conveyed.

In a preferred embodiment, the belts of the conveying means and compression means are counter rotating, preferably wherein the compression means belt is a shorter top belt and the conveying means belt is a longer, counter rotating bottom belt.

The conveying means belt is preferably a rumbling conveyor.

The compression means belt is preferably provided with a plurality of apertures to allow expelled air from a non-intact package to escape through when that package is compressed. Additionally, the conveying means belt is preferably provided with projections, e.g. round studs, to stop the package moving around on the conveying means when being transported.

Additionally, or alternatively, each belt independently may be modular or continuous.

The compression means is preferably from about 250 mm to about 1.5 m in length, particularly preferably from about 500 mm to about 750 mm, e.g. about 1.2 m in length. Due to the fact that the conveying means is longer than in prior art systems, less pressure needs to be applied by the compression means to expel the equivalent amount of air from the packages. As a result, there will be less damage to the product using the testing apparatus and process according to the invention when compared to prior art systems.

The diagonal distance of the compression means is preferably in the range of from about to about, e.g. 1480 mm.

The conveying means is preferably longer than the compression means, e.g. about 3 m in length. However, this is not to be considered limiting and other lengths are considered to be within the scope of the invention.

The conveying means is preferably either invertor driven or provided with an encoder.

The rejecting means preferably comprises a nozzle adapted to provide a blast of air, e.g. a pneumatic blast of air.

In a preferred embodiment, the apparatus further comprises one or more triggering means in electronic signal communication with the volume detecting means to warn the first and/or second volume detecting means that a package is coming. Particularly preferably, the apparatus further comprises one triggering means in electronic signal communication with the first volume detecting means and a second triggering means in electronic signal communication with the second volume detecting means.

The or each triggering means is preferably downstream of the volume detecting means it is intended to warn. This is because the area that the volume detecting means is detecting, e.g. the area the camera is taking an image of, encompasses the area where the package is triggered. This removes the need for a timer, e.g. to tell the camera shutter to activate.

In a particularly preferred embodiment, the first volume detecting means comprises one or two cameras and a first triggering means is directly wired to the or each camera. This has the result that when the triggering means sees the leading edge of the package, the or each camera takes an image immediately. This means that no matter what the length of the package is, the whole package will be within the camera area.

Alternatively, or additionally, the second volume detecting means comprises one or two cameras and a second triggering means is directly wired to the or each camera.

Preferably, each triggering means independently comprises: an emitter emitting radiation; a radiation detector detecting the emitted radiation; and a processor determining the position of the package based on the detected radiation, particularly preferably wherein the radiation is laser light.

In this embodiment, each triggering means independently acts a gate that starts an internal timer. The processor is preferably provided with information as to what speed the conveying means is moving as well as the distance from the gate to the volume detecting means such that upon receipt of the emitted radiation, the processor can instruct the volume detecting means when to take an image of the package.

The emitter emitting radiation and radiation detector detecting the emitted radiation may be two separate sender/receiver modules wherein one module permanently emits radiation and if the other module stops receiving it, then the processor knows a package has passed through.

Alternatively, the emitter emitting radiation and radiation detector detecting the emitted radiation may be a single sender/receiver module. In this embodiment, when the module receives a reflection, the processor knows a package is in front of the module.

Alternatively, or additionally, the apparatus further comprises a pre-conditioning system, e.g. a rotatable brush, upstream from the first position to ensure each package is flat before arriving at the first position by removing pockets of air beneath the package. The pre-conditioning system is preferably motor driven, e.g. a motor driven rotatable brush.

The apparatus preferably accepts the package or packages to be tested from an upstream bag maker such as a vertical form fill seal bagger, horizontal flow wrapper or the like. In this embodiment, the apparatus is in electronic signal communication with the upstream bagger to obtain package size information in order to ascertain how much force to apply to the package with the compression means.

In an alternative, less preferred embodiment, upon measuring the volume of the bag at the first position, the compression means applies a predetermined force for that volume. This is less preferred in light of the fact that two packages may be of the same volume but have different contents and/or packing density that would require a different amount of compression.

In a preferred embodiment, the apparatus further comprises identification means, for example a camera, upstream of the first position and in electronic signal communication with the determining means to gather supplementary information while the package is on the conveying means. The supplementary information may comprise one or more of: package type information, e.g. package dimensions for compression means belt height or other parameter setting, information as to whether or not the printer has successfully printed a best before date on the package, barcode data, confirmation that the correct package type is being used (e.g. labelled salt and vinegar instead of cheese and onion), average package volume over a predetermined period of time, number of packages that have passed through the volume detecting means in a predetermined time period and the like.

Alternatively, the first and/or second volume detecting means are used to gather such supplementary information.

Such supplementary information is useful to the operator because it may be used to determine whether or not a package filling and sealing apparatus, e.g. a bag maker, providing packages to the apparatus of the invention is set up to result in the right amount of air in the package.

The supplementary information such as package labelling may be used in combination with the rejecting means to reject incorrectly labelled packages.

The amount of force applied by the or each compression module to the interior surface of the belt is preferably variable, e.g. by changing the pressure going to the or each actuator. The pressure may be set by the operator. Additionally, or alternatively, the pressure may be part of an automatic parameter setting system, e.g. controlled by the processing system.

In a preferred embodiment, the apparatus further comprises projecting means to provide the volume detecting means with something to focus on. The projecting means preferably comprises radiation means, e.g. a laser, for providing the package to be tested with a matrix of lines or dots.

In a further aspect the invention provides a method of testing the integrity of a package using the apparatus as defined herein, the method comprising the following steps:
 a) detecting a first volume of the package at a first position using first volume detecting means;
 b) using conveying means to move the package from the first position to a second position downstream from the first position;
 c) using compression means between the first and second position to provide a variable compression force on the package;
 d) detecting a second volume of the package at the second position using second volume detecting means;
 e) determining the integrity of the package based upon a change in volume of the package using determining means; and
 f) removing the package from the apparatus further downstream using rejection means if the package is determined by the determining means to lack integrity, i.e. if the package volume at the second position is detected to be a predetermined amount below the volume at the first position.

The first volume of a package at the first position is a baseline volume for that particular package.

The predetermined amount below the volume at the first position is preferably a user determined percentage, e.g. if the package volume at the second position is detected to be in the range of from about 10% to about 20% below the volume at the first position.

In a preferred embodiment, the method further comprises one or more of the following optional steps:
 presenting a package to the apparatus from a bag maker, optionally wherein the package is dropped onto the conveying means, e.g. either directly or from a bag maker incline belt;

pre-conditioning the package is, preferably using a rotating brush under which the package is run, or alternatively using vibrating means or other form of interference device on the conveying means, e.g. on a bottom belt of the conveying means;

running the package through a set of guides to ensure alignment such that it is presented to the first volume detecting means in the correct orientation;

warning the volume detecting means that a package is coming using triggering means;

if the package volume at the first position is detected to be below a certain expected volume, removing the package from the apparatus since it may be completely burst and therefore would not show any decrease in volume at the second position;

running the package through a set of guides to ensure alignment such that it is presented to the second volume detecting means in the correct orientation.

The volume measurements do not need to be made before the package enters the compression means. In a preferred embodiment, the compression means comprises a transparent belt to allow the volume detecting means, e.g. camera or cameras, to take the measurement during movement of the package through the compression means.

In use, the two volume detecting means are preferably identical in execution. In a particularly preferred embodiment, cameras of the first volume detecting means are triggered, e.g. by a laser light gate, and prepared to begin taking an image of a package. The package then travels along the conveying means, e.g. a bottom belt, and reaches a matrix of lines or dots which are projected onto package by a laser. The cameras of the first volume detecting means then take two images of the package including the matrix and combine the images to produce one stereo image. The processing system takes this stereo image and assesses by how much the lines or dots have been deformed from their natural state. This matrix deformation is used to assess the volume of the package. Once the package has been assessed at the first position, this information is saved and the processing system tracks where the conveying means is in respect of the compression means. Once the package comes through the second triggering means, the above is repeated accordingly at the second position with the second volume detecting means.

BRIEF DESCRIPTION OF THE DRAWINGS

Certain preferred embodiments of the present invention will now be described, by way of example only, with reference to the accompanying drawings in which.

DETAILED DESCRIPTION

Figure 1:
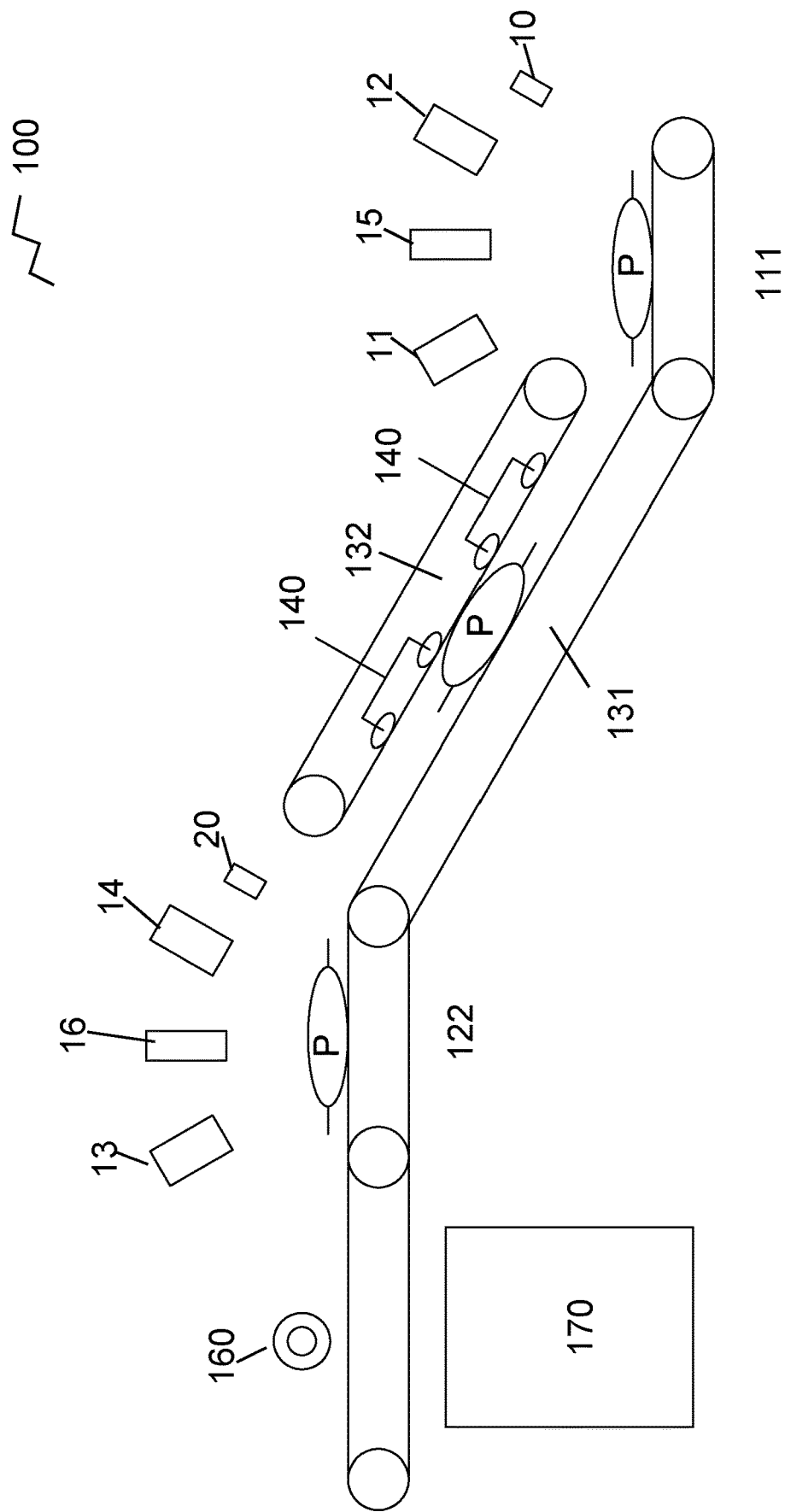
FIG. 1 shows a schematic view of a preferred apparatus according to the invention for testing the integrity of a package.

Various embodiments of the present invention will be described in detail with reference to the drawings, where like reference numerals represent like parts and assemblies throughout the several views.

Referring to the drawings and especially to FIG. 1, there is shown a preferred apparatus according to the invention for testing the integrity of a package P, the apparatus generally referred to by the reference numeral 100 and comprising a laser 15 for projecting a matrix onto package P at a first position 111, two cameras 11, 12 for detecting a first volume of package P at first position 111; a laser light gate 10 comprising an emitter and a receiver to warn cameras 11, 12 that package P is coming; bottom belt 131 for moving package P from first position 111 to a second position 122 downstream from first position 111; compression modules 140 for providing a variable compression force on package P via top belt 132 while package P is being moved between top belt 132 and bottom belt 131; a laser 16 for projecting a matrix onto package P at second position 122, two cameras 13, 14 for detecting a second volume of package P at second position 122, a laser light gate 20 to warn cameras 13, 14 that package P is coming; a processing system (not shown) for determining the integrity of package P based upon a change in volume or lack thereof; reject nozzle 160 and reject bin 170.

Figure 4:
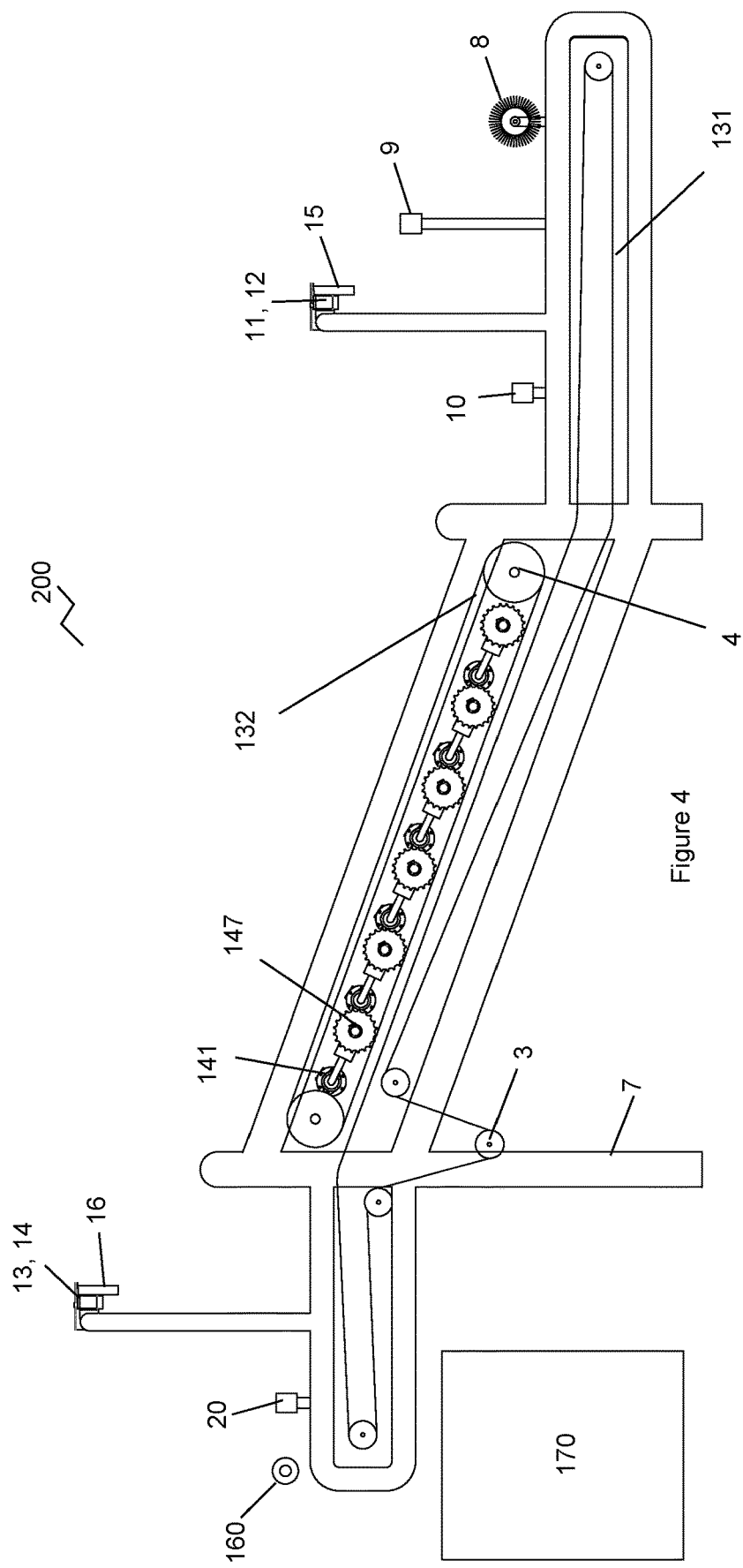
FIG. 4 shows a cross-sectional view of another preferred apparatus according to the invention for testing the integrity of a package.

As shown in FIGS. 1 and 4, top belt 132 is shorter than bottom belt 131. Whilst it cannot be seen from the Figures, top belt 132 is counter rotating with respect to bottom belt 131.

Lasers 15, 16 provide package P with a matrix of lines or dots to give cameras 11, 12 and 13, 14, respectively, something to focus on.

Cameras 11, 12 produce a stereo image of package P at first position 111.

Cameras 13, 14 produce a stereo image of package P at second position 122.

Each of cameras 11, 12, 13 and 14, laser light gates 10, 20 and reject nozzle 160 are in electronic signal communication with the processing system, e.g. a computer.

The processing system compares the stereo image taken by cameras 11, 12 at first position 111 and the stereo image taken by cameras 13, 14 at second position 122 in order to assess whether the volume of package P has been reduced on compression.

In the event that the integrity of package P is determined by the processing system not to be intact, reject nozzle 160 removes package P from bottom belt 131 into reject bin 170 using a pneumatic blast of air.

Top belt 132 is a plastic modular belt provided with apertures (not shown) to allow air to escape when a leaking package P is compressed by compression modules 140. Top belt 132 is further provided with outwardly protecting round studs (not shown) to stop package P from moving around when being transported under compression modules 140 by bottom belt 131.

Figure 3:
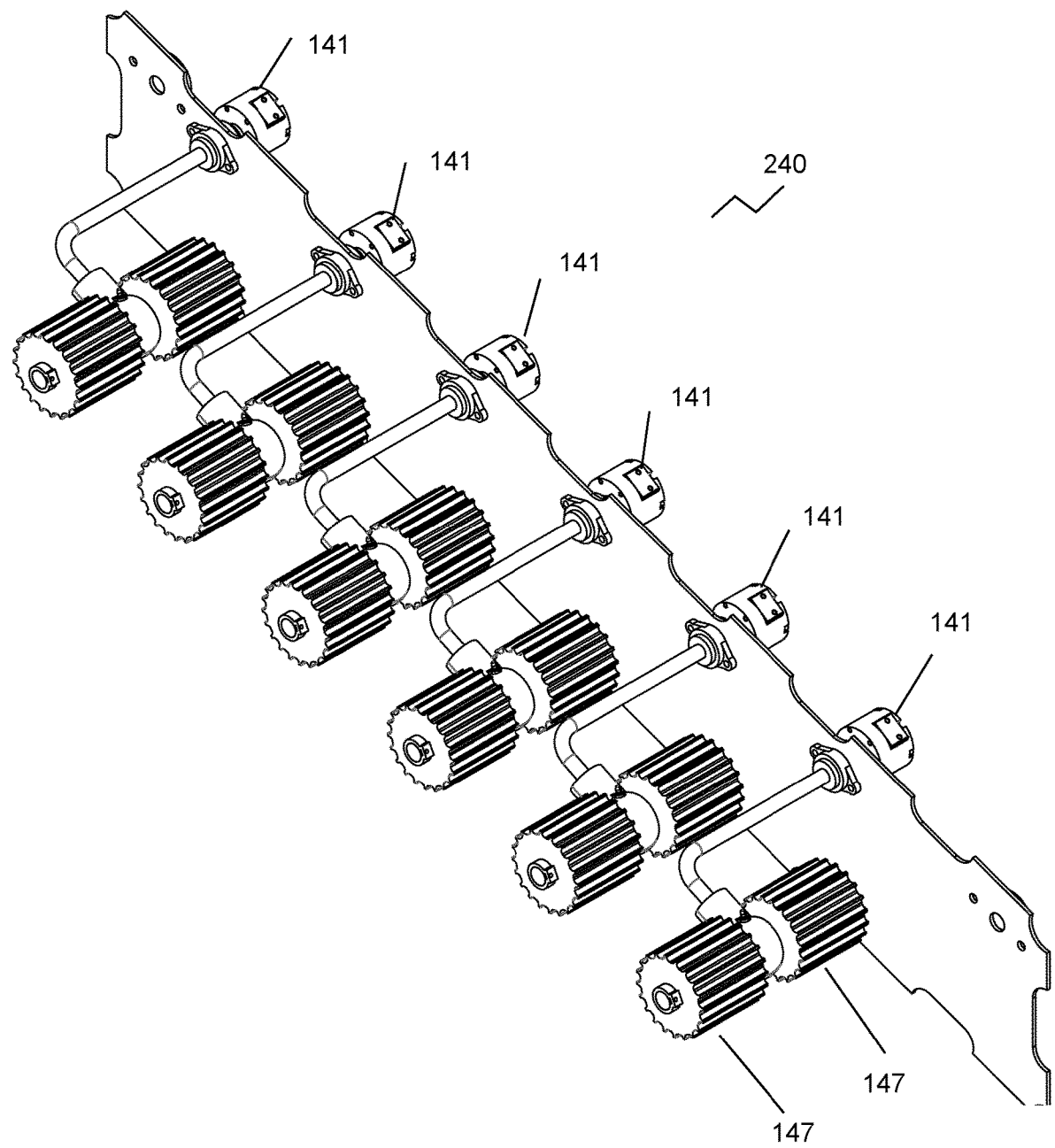
FIG. 3 shows a perspective view from above of preferred compression modules according to FIG. 2.

As can be seen in FIG. 3, compression modules 140 are part of a roller assembly 240 driven by a pneumatic cylinder (not shown). Roller assembly 240 pushes down on top belt 132 to apply the required force. Adjustment may made by way of a regulator controlling the cylinder stroke length.

Figure 2:
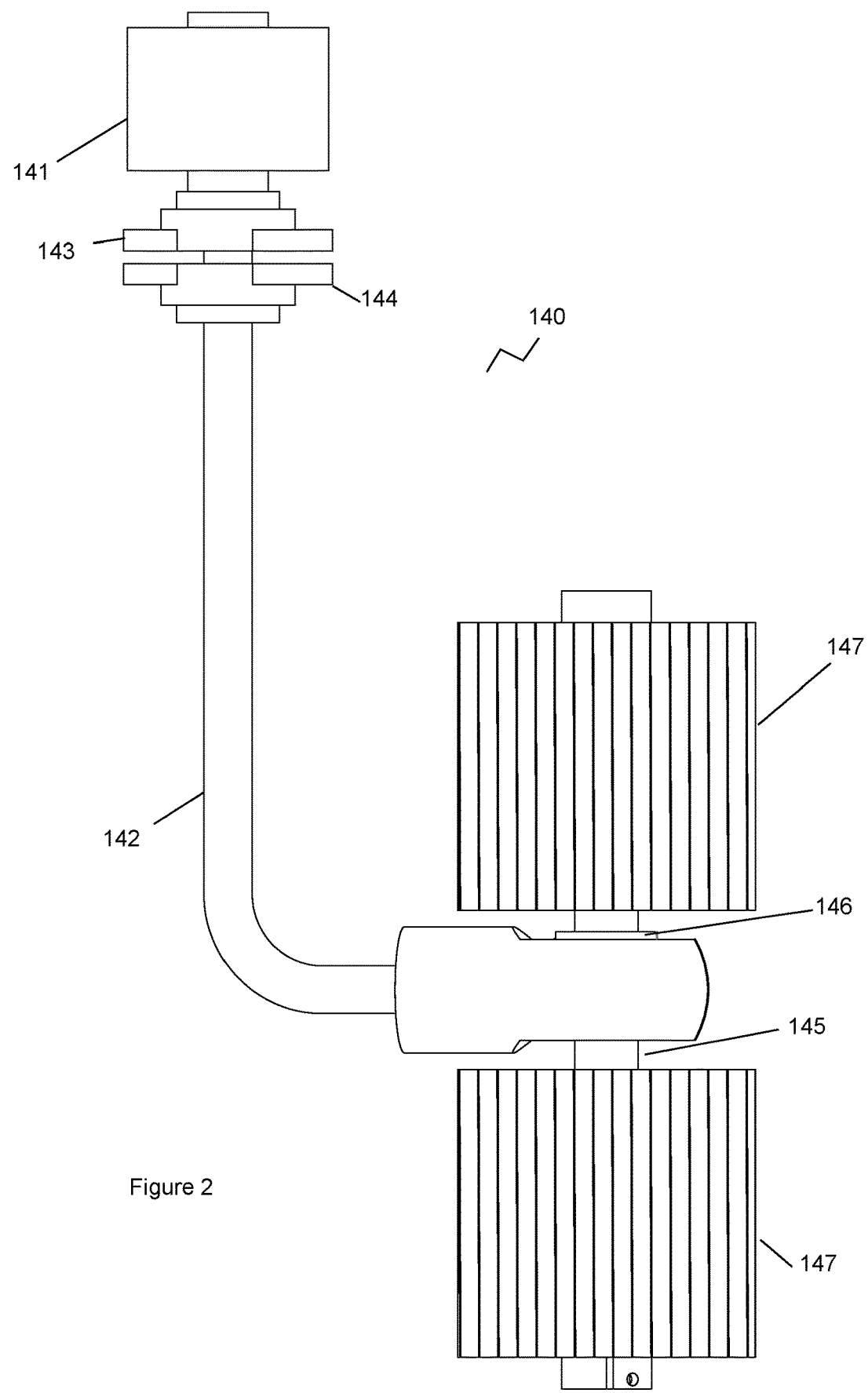
FIG. 2 shows a plan view of a preferred compression module for use with the apparatus according to the invention.

As shown in FIG. 2, each compression module 140 comprises rotary pneumatic actuator 141, first shaft 142 with a 90 degree bend, two flange bearings 143, 144 to hold shaft 142 in place while allowing it to swivel, second shaft 145 that is rotated on movement of top belt 132, a hanger bearing 146 to allow shaft 145 to rotate, two compression rollers 147 for applying force to the belt 132.

Each compression roller 147 has a substantially cylindrical body with a plurality of parallel transverse protrusions 148 on the surface thereof.

The amount of force applied to top belt 132 by compression modules 140 can be varied by changing the pressure going to actuators 141. This force can either be set by the operator or be part of an automatic parameter setting system used by the processing system.

The two volume detecting means are identical in execution. Cameras 11 and 12 are each triggered by laser light gate 10 and prepared to begin taking an image of package P. Package P then travels along bottom belt 131 and reaches a matrix of lines or dots which are projected onto package P by laser 15. Cameras 11, 12 take two images of package P including the matrix and combine the images to produce one stereo image. The processing system takes this stereo image and assesses by how much the lines or dots have been deformed from their natural state. This matrix deformation is used to assess the volume of package P. Once package P has been assessed at first position 111, this information is saved and the processing system tracks where bottom belt 131 is in respect of compression modules 140. The amount of pressure applied by compression modules 140 may be automatic or operator adjustable.

Once package P comes through laser light gate 20, the above is repeated accordingly at second position 122 with laser light gate 20, laser 16 and cameras 13, 14.

Apparatus 100 may be set to allow an amount of variation of the package volumes. This volume variation may be dependent on the product in package P and/or dimensionally dependent as well as optionally adjustable by the user. If package P exceeds the amount of volume reduction allowed, package P is rejected further downstream, preferably using a pneumatic blast of air.

All information is preferably collected by the processing system and presented to the operator through a Human Machine Interface such that it may be exported for further analysis.

FIG. 4 shows a preferred apparatus 200 which includes all the components of apparatus 100 as shown in FIG. 1 as well as frame 7, conditioning brush 8 and inspection camera 9. Drive 3 for bottom belt 131 and drive 4 for top belt 132 are also visible in this Figure as well as rotary pneumatic actuators 141 and compression rollers 147.

Conditioning brush 8 is a drum motor driven brush which ensures each package P is flat before getting to camera 11, 12.

Inspection camera 9 in electronic signal communication with the processing system and is used to observe and identify each package P. Inspection camera 9 is adapted to identify what size the package is and what type of food product it is labelled to contain, including for example the flavour of that food product. Inspection camera 9 is also used to count the number of packages P. This data collection by inspection camera 9 is used for tuning parameters applied to the apparatus by the processing system such as the pressure going to actuators 141.

It is to be understood that the invention is not limited to the specific details described herein which are given by way of example only and that various modifications and alterations are possible without departing from the scope of the invention as defined in the appended claims.

The invention claimed is:

1. An apparatus for testing the integrity of a package, the apparatus comprising:
   a first volume detecting means for detecting a first volume of the package at a first position;
   conveying means for moving the package from the first position to a second position downstream from the first position;
   compression means for providing a compression force on the package;
   a second volume detecting means for detecting a second volume of the package at the second position;
   determining means for determining the integrity of the package based upon a change in volume of the package; and
   rejecting means for removing packages, the integrity of which is determined by the determining means not to be intact,
   wherein the determining means is in electronic signal communication with each volume detecting means independently,
   wherein the determining means is in electronic signal communication with the rejecting means,
   wherein the compression means is located above a portion of the conveying means and
   wherein each volume detecting means independently comprises two cameras for producing a stereo image of the package or a single time-of-flight camera; and
   wherein the apparatus further comprises projecting means to provide the volume detecting means with something to focus on.

2. The apparatus of claim 1, wherein each volume detecting means independently comprises two black and white cameras for producing a stereo image of the package.

3. The apparatus of claim 1, wherein the determining means comprises a processing system such as a computer to compare the volume of a package at the first position and the volume of the package at the second position.

4. The apparatus of claim 1, wherein the compression means comprises a belt conveyor with one or more compression modules in contact with the interior surface of the belt.

5. The apparatus of claim 1, wherein the compression force provided by the compression means is a downwardly projecting force.

6. The apparatus of claim 1, wherein the compression means is in electronic signal communication with the determining means and the compression force provided by the compression means is variable.

7. The apparatus of claim 1, wherein the conveying means is adapted to stop a package moving position on the conveying means when being transported.

8. The apparatus of claim 1, wherein the compression means and conveying means each independently comprise a belt conveyor, wherein the belts of the conveying means and compression means are counter rotating, wherein the compression means belt is a shorter top belt and the conveying means belt is a longer, counter rotating bottom belt, and wherein the apparatus further comprises adjustment means to adjust the height of one belt with respect to the other.

9. The apparatus of claim 1, wherein the rejecting means comprises a nozzle adapted to provide a blast of air.

10. The apparatus of claim 1, wherein the apparatus further comprises a pre-conditioning system upstream from the first position to ensure each package is flat before arriving at the first position by removing pockets of air beneath the package.

11. The apparatus of claim 1, wherein the determining means is in electronic signal communication with an upstream bagger to obtain package size information in order to ascertain how much force to apply to the package with the compression means.

12. The apparatus of claim 1, wherein the apparatus further comprises identification means upstream of the first position and in electronic signal communication with the determining means to gather supplementary information while the package is on the conveying means.

13. The apparatus of claim 1, wherein the apparatus further comprises a first triggering means in electronic signal communication with the first volume detecting means and a second triggering means in electronic signal communication with the second volume detecting means.

14. A method of testing the integrity of a package using the apparatus of claim 1, the method comprising the following steps:
 a) detecting a first volume of the package at a first position using first volume detecting means;
 b) using conveying means to move the package from the first position to a second position downstream from the first position;
 c) using compression means between the first and second position to provide a variable compression force on the package;
 d) detecting a second volume of the package at the second position using second volume detecting means;
 e) determining the integrity of the package based upon a change in volume of the package using determining means; and
 f) removing the package from the apparatus further downstream using rejection means if the package is determined by the determining means to lack integrity, i.e. if the package volume at the second position is detected to be a predetermined amount below the volume at the first position.

15. The apparatus of claim 4, wherein each compression module comprises two rotatable compression rollers attached to a rotary actuator.

16. An apparatus for testing the integrity of a package, the apparatus comprising:
 a first volume detecting means for detecting a first volume of the package at a first position;
 conveying means for moving the package from the first position to a second position downstream from the first position;
 compression means for providing a compression force on the package;
 a second volume detecting means for detecting a second volume of the package at the second position;
 determining means for determining the integrity of the package based upon a change in volume of the package; and
 rejecting means for removing packages, the integrity of which is determined by the determining means not to be intact,
 wherein the determining means is in electronic signal communication with each volume detecting means independently,
 wherein the determining means is in electronic signal communication with the rejecting means,
 wherein the compression means is located above a portion of the conveying means and
 wherein each volume detecting means independently comprises two cameras for producing a stereo image of the package or a single time-of-flight camera; and
 wherein the compression means and conveying means each independently comprise a belt conveyor, wherein the belts of the conveying means and compression means are counter rotating, wherein the compression means belt is a shorter top belt and the conveying means belt is a longer, counter rotating bottom belt, and wherein the apparatus further comprises adjustment means to adjust the height of one belt with respect to the other.

17. The apparatus of claim 16, wherein the determining means comprises a processing system such as a computer to compare the volume of a package at the first position and the volume of the package at the second position.

18. The apparatus of claim 16, wherein the compression means comprises a belt conveyor with one or more compression modules in contact with the interior surface of the belt.

19. The apparatus of claim 16, wherein the compression means is in electronic signal communication with the determining means and the compression force provided by the compression means is variable.

20. A method of testing the integrity of a package using the apparatus of claim 17, the method comprising the following steps:
 a) detecting a first volume of the package at a first position using first volume detecting means;
 b) using conveying means to move the package from the first position to a second position downstream from the first position;
 c) using compression means between the first and second position to provide a variable compression force on the package;
 d) detecting a second volume of the package at the second position using second volume detecting means;
 e) determining the integrity of the package based upon a change in volume of the package using determining means; and
 f) removing the package from the apparatus further downstream using rejection means if the package is determined by the determining means to lack integrity, i.e. if the package volume at the second position is detected to be a predetermined amount below the volume at the first position.

* * * * *